United States Patent [19]
Gallucci

[11] Patent Number: 4,849,474
[45] Date of Patent: Jul. 18, 1989

[54] MOISTURE REDUCTION IN POLYAMIDE COMPOSITIONS

[75] Inventor: Robert R. Gallucci, Pittsfield, Mass.

[73] Assignee: General Electric Company, Pittsfield, Mass.

[21] Appl. No.: 271,348

[22] Filed: Nov. 10, 1988

Related U.S. Application Data

[63] Continuation of Ser. No. 816,472, Jan. 6, 1986, abandoned.

[51] Int. Cl.$^4$ .............................................. C08L 77/00
[52] U.S. Cl. ...................................... 525/92; 525/133; 525/178; 525/179; 525/391; 525/392; 525/905; 524/343
[58] Field of Search ................. 525/178, 179, 133, 92, 525/905, 391, 392

[56] References Cited

U.S. PATENT DOCUMENTS

| | | |
|---|---|---|
| 2,309,729 | 2/1943 | Gordon . |
| 2,374,576 | 4/1945 | Brubaker . |
| 3,207,620 | 9/1965 | Roth .................................... 524/343 |
| 4,171,330 | 10/1979 | Kyo et al. ............................ 524/538 |
| 4,315,086 | 2/1982 | Ueno et al. .......................... 525/392 |
| 4,628,069 | 12/1986 | Meyer et al. . |

FOREIGN PATENT DOCUMENTS

| | | |
|---|---|---|
| 0131445 | 1/1985 | European Pat. Off. ............ 525/397 |
| 0037575 | 10/1974 | Japan .................................. 525/343 |
| 59100715 | 11/1982 | Japan . |
| 958228 | 5/1964 | United Kingdom . |
| 1203283 | 8/1970 | United Kingdom . |

*Primary Examiner*—John C. Bleutge
*Assistant Examiner*—A. Carrillo
*Attorney, Agent, or Firm*—Spencer D. Conard

[57] ABSTRACT

Novel moisture resistant polyamide compositions are prepared comprising at least one polyamide and at least one di- or poly- hydric compound, oligomer or polymer free of sterically hindered hydroxy groups.

2 Claims, No Drawings

MOISTURE REDUCTION IN POLYAMIDE COMPOSITIONS

This is a continuation, of application Ser. No. 816,472, filed 01/06/86, now abandoned.

FIELD OF THE INVENTION

The present invention relates to novel polyamide compositions having reduced water absorption. More specifically, this invention relates to polyamide composition having incorporated therein a dihydric phenol which is capable of rendering the polyamide less susceptable to water.

BACKGROUND

Polyamides, otherwise known as nylons, are well known and have achieved great commercial success. While most polyamides are used in the manufacture of fibers and/or bristles, newer and/or modified polyamides are finding increasing use and demand in applications where parts are manufactured through a molding process, e.g. injection molding. Additionally, the development of polyamide blends with rubber polymers and copolymers as well as with other thermoplastics has greatly expanded the property profile and thus potential end use applications for polyamides.

However, in spite of the advances in polyamide technology and development, the utility of polyamides is still limited by their extreme sensitivity to moisture. As a result of their exposure to moisture, either by direct immersion or water vapor itself, e.g. high humidity, polyamides tend to gain weight and expand or swell. Consequently, those end use applications wherein weight and, more importantly, dimensional stability are required and critical are still out of reach of the polyamides and polyamide blends.

The present invention enables one to make polyamide compositions and polyamide blend compositions which have significantly reduced water absorption. Thus these compositions may be employed in those end use applications wherein retention of the dimensional specification of parts is critical.

SUMMARY OF THE INVENTION

The present invention is a thermoplastic polyamide composition comprising at least one polyamide and at least one oligomeric or polymeric phenol and/or dihydric or polyhydric phenol in an amount sufficient to reduce the water absorption of the polyamide. Specifically, it has now been found that oligomeric and polymeric phenols, e.g. polyvinyl phenols and phenol-formaldehyde resins, and di- and polyhydric phenols of the formulae:

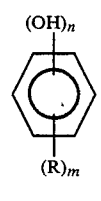

and

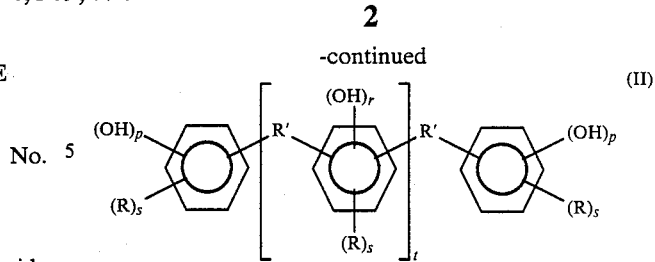

wherein n equals 2 or 3, m equals 3 or 4 and (n+m)=6; p equals 1 or 2, each r is independently equal to 0, 1 or 2, each s is independently equal to 0, 1, 2, 3 or 4 as appropriate; t equals 0, 1, 2, 3 or 4; each R is independently hydrogen; halogen, e.g. bromine, chlorine, fluorine, etc.; a $C_1$–$C_{16}$ alkyl, a $C_6$–$C_{18}$ aryl or a $C_7$–$C_{20}$ arylalkyl radical, any of which may be substituted with a $C_1$–$C_{12}$ alkyl group or with a halogen atom and whereby the aryl radical, if present, may be bonded by a —O—, $C_1$–$C_3$ alkylene or alkylidene, or —$SO_2$— bridge member; or a hydroxy aryl or alkyl hydroxy aryl radical; and each R' is independently selected from the group consisting of a direct carbon-carbon bond or a bridge member selected from the group consisting of divalent alkyl, aryl, arylalkyl, hydroxy aryl or alkyl hydroxy aryl radicals, including halogen substituted derivatives of each; divalent ester and amide radicals; and hetero containing bridges including:

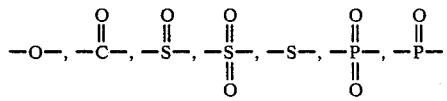

and the like; provided that there are no phenolic hydroxy groups having two adjacent alkyl radicals on the phenol ring with tertiary alpha carbon atoms; when admixed with polyamide in an amount of from about 0.5 to about 30 weight percent based on the polyamide have significantly improved dimensional stability and reduced water absorbtion.

DETAILED DESCRIPTION

Polyamides suitable for use in the practice of the present invention are well known and widely available. Basically they may be obtained by polymerizing a monoamino-monocarboxylic acid or a lactam thereof having at least 2 carbon atoms between the amino and carboxylic acid group; or by polymerizing substantially equimolecular proportions of a diamine which contains at least 2 carbon atoms between the amino groups and a dicarboxylic acid; or by polymerizing a monoaminocarboxylic acid or a lactam thereof as defined above together with substantially equimolecular proportions of a diamine and a dicarboxylic acid. The dicarboxylic acid may be used in the form of a functional derivative thereof, for example an ester or acid chloride.

The term "substantially equimolecular" proportions (of the diamine and of the dicarboxylic acid) is used to cover both strict equimolecular proportions and slight departures therefrom which are involved in conventional techniques for stabilizing the viscosity of the resultant polyamides.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned 6-aminocaproic acid, butyrolactam, pivalolactam, caprolactam, capryllactam, enantholactam, undecanolactam, dodecanolactam and 3and 4- aminobenzoic acids.

Diamines suitable for use in the preparation of the polyamides include alkyl, aryl and alkyl-aryl diamines. Such diamines include, for example, those represented by the general formula:

$$H_2N(CH_2)_nNH_2$$

wherein n is an integer of from 2 to 16, such as trimethylenediamine, tetramethylenediamine, pentamethylenediamine, octamethylenediamine and especially hexamethylenediamine, as well as trimethyl hexamethylene diamine, meta-phenylene diamine, meta-xylylene diamine and the like.

The dicarboxylic acids may be aromatic, for example isophthalic and terephthalic acids or aliphatic, wherein the aliphatic dicarboxylic acids are of the formula:

$$HOOC-Y-COOH$$

wherein Y represents a divalent aliphatic group containing at least 2 carbon atoms, and examples of such acids are sebacic acid, octadecanoic acid, suberic acid, glutaric acid, pimelic acid and adipic acid.

Typical examples of the polyamides or nylons, as these are often called, include for example:

| | |
|---|---|
| polypyrrolidone | (nylon 4) |
| polycaprolactam | (nylon 6) |
| polycapryllactam | (nylon 8) |
| polyhexamethylene adipamide | (nylon 6,6) |
| polyundecanolactam | (nylon 11) |
| polydodecanolactam | (nylon 12) |
| polyhexamethylene azelaiamide | (nylon 6,9) |
| polyhexamethylene sebacamide | (nylon 6,10) |
| polyhexamethylene isophthalimide | (nylon 6,I) |
| polyhexamethylene terephthalamide | (nylon 6,T) |
| polyamide of hexamethylene diamine and n-dodecanedioic acid | (nylon 6,12) | as well as polyamides resulting from terephthalic acid and/or isophthalic acid and trimethyl hexamethylene diamine, polyamides resulting from adipic acid and meta xylylenediamines, polyamides resulting from adipic acid, azelaic acid and 2,2-bis-(p-aminocyclohexyl)propane and polyamides resulting from terephthalic acid and 4,4'-diamino-dicyclohexylmethane.

Copolymers of the foregoing polyamides or prepolymers thereof are also suitable for use in the practice of the present invention. Such copolyamides include copolymers of the following:

| | |
|---|---|
| hexamethylene adipamide/caprolactam | (nylon 6,6/6) |
| hexamethylene adipamide/hexamethylene isophthalamide | (nylon 6,6,I) |
| hexamethylene adipamide/hexamethylene terephthalamide | (nylon 6,6,T) |
| hexamethylene adipamide/hexamethylene azelaiamide | (nylon 6,6/9) |
| hexamethylene adipamide/hexamethylene azelaiamide/caprolactam | (nylon 6,6/9/6) |

Mixtures and/or copolymers of two or more of the foregoing polyamides or prepolymers thereof, respectively, are also within the scope of the present invention.

The foregoing polyamides are rendered more dimensionally stable and less susceptible to water absorption by incorporating therein an oligomeric or polymeric phenol or a dihydric or polyhydric phenol.

Oligomeric and polymeric phenols are characterized as having free (i.e. unreacted) phenolic hydroxy groups along the oligomer or polymer chain or pendant phenol radicals attached to the oligomer or polymer chains. These will generally have a number average molecular weight of up to 40,000, preferably from about 400 to 30,000. Examplary of suitable polymeric phenols there may be given polyvinyl phenols and the phenol- formaldehyde resins (e.g. Novolak and resol resins).

The preferred phenols are the dihydric or polyhydric phenols, particularly the bisphenols. Such phenols will generally be of the formulae:

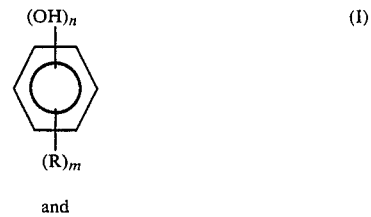

and

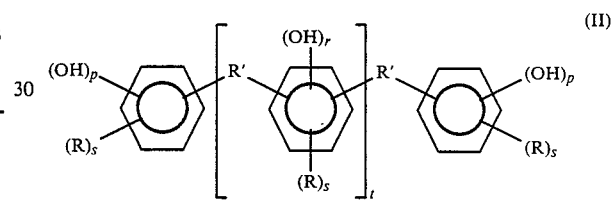

wherein n equals 2 or 3, m equals 3 or 4 and (n+m)=6; p equals 1 or 2, each r is independently equal to 0, 1 or 2, each s is independently equal to 0, 1, 2, 3 or 4 as appropriate; t equals 0, 1, 2, 3 or 4; each R is independently hydrogen; halogen, e.g. bromine, chlorine, fluorine, etc.; a $C_1$-$C_{16}$ alkyl, a $C_6$-$C_{18}$ aryl or a $C_7$-$C_{20}$ arylalkyl radical, any of which may be substituted with a $C_1$-$C_{12}$alkyl group or with a halogen atom and whereby the aryl radical, if present, may be bonded by a —O—, $C_1$-$C_3$ alkylene or alkylidene, or —$SO_2$— bridge member; or a hydroxy aryl or alkyl hydroxy aryl radical; and each R' is independently selected from the group consisting of a direct carbon-carbon bond or a bridge member selected from the group consisting of divalent alkyl, aryl, arylalkyl, hydroxy aryl or alkyl hydroxy aryl radicals, including halogen substituted derivatives of each; divalent ester and amide radicals; and hetero, containing bridges including:

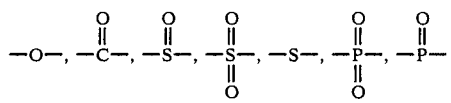

and the like; provided that there are no phenolic hydroxy groups having two adjacent alkyl radicals on the phenol ring with tertiary alpha carbon atoms.

Exemplary of phenols corresponding to the above formulae there may be given resorcinol; hydroquinone; 1,2,4-benzenetriol; phloroglucinol; 2,2-bis(4-hydroxyphenyl)propane; bis(4-hydroxyphenyl)methane; 2,2-bis(4-hydroxyphenyl)heptane; 2,2-bis(3-chloro-4-hydroxyphenyl)propane; 2,2-bis(3,5-dichloro-4-hydroxyphenyl)propane; 2,2-bis(3,5-dibromo-4-hydroxyphenyl)propane; 4,4'-(p-phenylenediisopropylidene)-bis(2,6-xylenol); 4,4'-(p-phenylenediisopropylidene)bisphenol; methylene bisphenol; biphenol; naphthalenediol; 4,4'-cyclohexylidene bisphenol; alpha,alpha',alpha"-bis(4-hydroxyphenol)-1,3,5-triisopropyl benzene; 2,2-bis(3-methyl-4-hydroxyphenyl)propane; 2,2-bis(3,5-dimethyl-4-hydroxyphenyl)sulfone; 2,2-bis(4-hydroxyphenyl)sulfone; 2,2-(2,4-dihydroxyphenyl)sulfone; and the like.

The amount of polymeric phenol or bisphenol to be employed in the practice of the present invention is that amoumt capable of providing dimensional stability and reducing water absorption in the polyamide, preferably at least 10% improvement, as compared to the unmodified polyamide. Generally, the amount of phenol will be from about 0.5 to about 30, preferably for about 2 to about 25 percent by weight based on the combined weight of phenol and polyamide.

The present invention is also applicable to polyamide compositions further comprising a second thermoplastic polymer and/or a rubbery impact modifier. While in essence any weight ratio, e.g. 1-99:99-1 of the second thermoplastic polymer to polyamide is practical and employable, depending upon the desired characteristics of the final blend compositions, those blends containing a rubbery impact modifier should do so up to no more than 50% by weight; preferably from about 5 to about 35% by weight based on the total composition.

Suitable thermoplastic polymers that may be included in the blends contemplated by the present invention include polyimides, polyamideimides, polyetherimides, polyalkylene ethers, polyphenylene ethers, polyarylates, polyesteramides, polyesters and the like. All of these thermoplastic polymers are well known and widely available.

Suitable rubbery impact modifiers are also well known and widely available. Exemplary of the many rubbery impact modifiers included within the scope of the present invention there may be given polyolefins and copolyolefins, e.g. polyethylenes, polypropylene, ethylene-propylene copolymer, copolymers of ethylene with acrylic acids and alkylacrylic acids, etc.; ethylene-propylene-diene monomer rubbers (EPDM); diene rubbers and copolymers, e.g. polybutadiene, polyisoprene, styrene-butadiene copolymer, styrene-butadiene-styrene block copolymers, and the like; nitrile rubbers and copolymers, e.g. styrene-acrylonitrile, acrylonitrile-butadiene-styrene type copolymers, etc. Such suitable rubbery impact modifiers are described in U.S. Pat. Nos. 2,933,480; 2,962,451; 3,000,866; 3,093,620; 3,093,621; 3,063,973; 3,147,230; 3,154,528; 3,260,708 among others, and in Sittig, "Stereo Rubber and Other Elastonic Process", Noyes Development Corporation, Park Ridge, NJ (1967), altogether herein incorporated by reference.

A preferred class of rubbery impact modifiers are as described above except that they have copolymerized therewith or grafted thereon a monomer having a pendent (non-reacted) functional group; e.g. carbonyl, carboxy, carboxylic acid anhydride, epoxy, ether, ester, amine, amide, etc., which is capable of interacting chemically, e.g. bonding, or physically, with the polyamide to further enhance the impact strength thereof over and above that of the non-functionalized rubber. Such functionalized rubbery impact modifiers and blends thereof with polyamide are available commercially and are described in U.S. Pat. Nos. 4,174,358; 4,474,927; 4,346,194; 4,251,644; 3,884,882; 4,147,740; 3,388,186 and 3,465,059, among others and Gallucci et al., "Preparation and Reactions of Epoxy-Modified Polyethylene" J. App. Poly. Sci. V.27, pp. 425-437 (1982), altogether incorporated herein by reference.

Optionally, the compositions of the present invention may also contain one or more fillers and/or reinforcing agents. Exemplary of such fillers and/or reinforcing agents there may be given glass fibers, carbon fibers, glass spheres, mineral fillers, including mica and silica, carbon black, and the like. Where such fillers and/or reinforcing agents are employed they should constitute no more than up to about 50% by weight, preferably from about 5 to about 30% by weight of the composition based on the total composition.

Finally, the composition of the present invention may also contain such other ingredients as flame retardants, colorants, nucleating agents, drip inhibitors, stabilizers and the like in effective amounts known in the art for their conventionally employed purposes.

The composition of the present invention may be prepared by any of the known methods for melt blending. For example, the ingredients may be dry blended and extruded or fluxed on a mill and comminuted or they may be prepared by extrusion compounding. Suitable equipment for such processes include extruders, Banbury mixers, rollers, kneaders and the like. Additionally, these compositions may be prepared by continuous or batch processing.

The following examples are provided in order for those skilled in the art to better understand how to practice the present invention. These examples are for illustration only and are not intended to limit the invention thereto. Unless otherwise stated, all formulations are expressed in terms of parts by weight.

All blends were prepared by extrusion on either a single screw or twin screw extruder at 250°–300° C. All ingredients were mixed and fed together. Blend compositions were injection molded after drying for preparation of test parts.

TABLE 1

| | A | 1 | B | 2 | 3 | C | 4 | D | 5 | E | 6 | F | 7 |
|---|---|---|---|---|---|---|---|---|---|---|---|---|---|
| polyamide 6 | 100 | 95 | — | — | — | 50 | 50 | — | — | 50 | 50 | — | — |
| polyamide 6,6 | — | — | 100 | 95 | 90 | — | — | 50 | 50 | — | — | 50 | 50 |
| polyphenylene ether[a] | — | — | — | — | — | 50 | 50 | 50 | 50 | — | — | — | — |
| polytherimide[b] | — | — | — | — | — | — | — | — | — | 50 | 50 | 50 | 50 |
| Bisphenol A | — | 5 | — | 5 | 10 | — | 3 | — | 5 | — | 3 | — | 5 |
| % water gain* | 9.6 | 8.2 (14) | 7.3 | 6.0 (18) | 4.5 (38) | 4.1 | 3.0 (27) | 4.0 | 3.1 (22) | 5.3 | 4.6 (12) | 4.2 | 3.3 (21) |
| Expansion mils in* | 22.4 | 14.6 | 16.8 | 9.6 | 7.2 | 9.4 | 6.0 | 9.5 | 6.9 | 11.9 | 10.3 | 9.0 | 7.2 |

TABLE 1-continued

| | A | 1 | B | 2 | 3 | C | 4 | D | 5 | E | 6 | F | 7 |
|---|---|---|---|---|---|---|---|---|---|---|---|---|---|
| | | (35) | | (43) | (57) | | (36) | | (27) | | (13) | | (20) |

[a] poly (2,6-dimethy-1,4-phenylene) oxide from General Electric Company
[b] polyetherimide of bisphenol dianhydride and meta-phenylene diamine sold as ULTEM ® 1000 resin from General Electric Company
*60 hour and 40 hour immersion in water at 75° C. for examples A–B and 1–3 and examples C–F and 4–7, respectively. The number in parenthesis represents the % improvement over the control.

Moisture absorption and expansion were usually measured on samples immersed in de-ionized water for approximately 40 hrs at 75° C. Samples were cooled to room temperature for testing. In some cases, moisture absorption was measured on samples immersed in water at room temperature for 3 weeks. Both methods gave similar results.

EXAMPLES 1–7, COMPARATIVE EXAMPLES A–F

A series of polyamide and polyamide blend compositions were prepared demonstrating the applicability of the present invention to various polyamide compositions. In these examples, the bisphenol employed was 2,2-bis(4-hydroxyphenyl)propane (Bisphenol A). The formulations of the specific examples and the results achieved with each were as shown in Table 1.

As can be seen from each of the examples in Table 1, Bisphenol A significantly reduced the water absorption and, more importantly, the expansion due to moisture in both straight polyamide and blends thereof with other thermoplastic polymers. It was also observed that the addition of Bisphenol A enhanced the processability of the compositions resulting in the increased spiral flow.

EXAMPLES 8–10, COMPARATIVE EXAMPLE G

A second series of blends were prepared to demonstrate the effectiveness of the bisphenol at different loadings. The specific compositions and the results achieved with each were as shown in Table 2.

TABLE 2

| | G | 8 | 9 | 10 |
|---|---|---|---|---|
| polyamide 6,6 | 50 | 50 | 50 | 50 |
| polyetherimide[a] | 50 | 50 | 50 | 50 |
| bisphenol A | — | 2 | 5 | 11 |
| % weight gain* | 4.2 | 3.7 | 3.3 | 2.4 |
| | | (12) | (21) | (43) |
| expansion* mils/in | 9.0 | 8.3 | 7.2 | 3.9 |
| | | (8.) | (20) | (57) |

[a] see note b, Table 1
*40 hour immersion in water at 75° C.

EXAMPLES 11–16, COMPARATIVE EXAMPLE H

An additional series of compositions was prepared demonstrating the efficacy of various bisphenols for reducing water absorbtion in polyamide compositions. The specific formulations and physical properties of each were as shown in Table 3. Each of the compositions in Table 3 comprises 45 parts polyphenylene ether; 45 parts polyamide 6,6; 10 parts styrene-hydrogenated butadiene-styrene triblock copolymer; 0.7 parts citric acid monohydrate and the indicated bisphenol. Weight gain was tested on samples immersed in water for 21 days at room temperature.

TABLE 3

| Example | Additive | Amount (parts) | % Weight gain* | Notched Izod ft.lb/in. | % Elongation |
|---|---|---|---|---|---|
| G | None | — | 2.43 | 3.1 | 38 |
| 11 | Bisphenol A (BPA) | 3.0 | 1.92 | 3.3 | 32 |
| 12 | Tetramethyl BPA | 3.0 | 2.01 | 3.3 | 30 |
| 13 | resorcinol | 2.0 | 2.25 | 3.2 | 34 |
| 14 | 4,4'-sulfonyl diphenol | 2.0 | 2.20 | 2.9 | 30 |
| 15 | dixylenol sulfone* | 3.0 | 2.06 | 4.0 | 26 |
| 16 | Tetrabromo BPA | 4.0 | 2.26 | 0.9 | 2 |

*0.35 parts maleic anhydride compatibilized instead of citric acid monohydrate

EXAMPLES 17–18, COMPARATIVE EXAMPLE I

A final series of compositions was prepared demonstrating the efficacy of polymeric phenols for use in the practice of the present invention. These compositions and the physical properties thereof were as shown in Table 4. All compositions comprise 45 parts polyphenylene oxide; 45 parts polyamide 6,6; 10 parts styrene-hydrogenated butadiene-styrene tribock copolymer and 0.35 parts maleic anhydride. Expansion and weight gain were determined on samples immersed in water for 40 hours at 75° C. Percent improvement is shown in parenthesis.

TABLE 4

| Example | Additive | Amount (parts) | % Weight gain | Expansion mils/in |
|---|---|---|---|---|
| I | — | — | 2.82 | 7.0 |
| 17 | polyvinyl phenol A[a] | 3.0 | 2.12(25) | 5.0(29) |
| 18 | polyvinyl phenol B[b] | 3.0 | 2.13(24) | 5.5(21) |

[a] polyvinyl phenol, number average molecular weight 1,500–7,000.
[b] polyvinyl phenol, number average molecular weight 30,000.

Obviously, other modifications and variations of the present invention are possible in light of the above teachings. It is therefore to be understood that changes may be made in the particular embodiments of the invention described which are within the full intended scope as defined by the appended claims.

I claim:
1. A polyamide composition comprising:
   (a) at least one polyamide;
   (b) at least one polyphenylene ether;
   (c) at least one compound selected from the group consisting of maleic anhydride and citric acid; and
   (d) at least one polyvinyl phenol having a number average molecular weight of from 400 to 40,000, said polyvinyl phenol being present in said composition in an amount of from 0.5 to about 30 percent by weight based on the combined weight of polyvinyl phenol and polyamide.
2. A composition as in claim 1 wherein said composition further comprises a styrene-hydrogenated butadiene-styrene triblock copolymer.

* * * * *